T. BERLIZE.
TWO-STROKE CYCLE INTERNAL COMBUSTION ENGINE.
APPLICATION FILED JUNE 23, 1914.
1,201,242.
Patented Oct. 17, 1916.
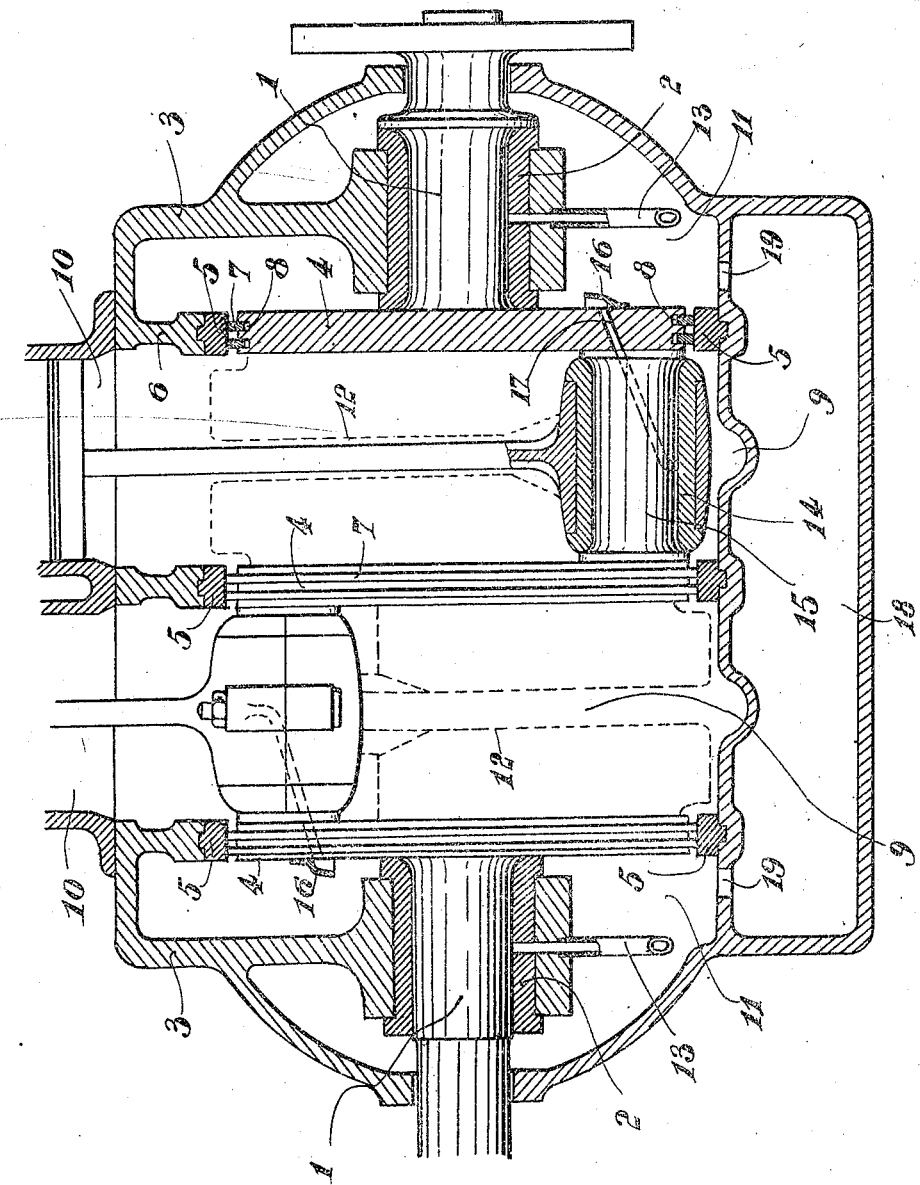

UNITED STATES PATENT OFFICE.

THÉOPHILE BERLIZE, OF BRUSSELS, BELGIUM, ASSIGNOR TO SOCIÉTÉ LE MOTEUR BERLIZE, OF ANTWERP, BELGIUM, A CORPORATION OF BELGIUM.

TWO-STROKE-CYCLE INTERNAL-COMBUSTION ENGINE.

1,201,242.   Specification of Letters Patent.   Patented Oct. 17, 1916.

Application filed June 23, 1914. Serial No. 846,743.

*To all whom it may concern:*

Be it known that I, THÉOPHILE BERLIZE, citizen of Belgium, residing at Brussels, Belgium, have invented certain new and useful Improvements in Two-Stroke-Cycle Internal-Combustion Engines, of which the following is a specification.

This invention relates to the crank casings of two stroke cycle internal combustion engines and it has for its object to provide means independent of the bearings of the crank shaft for insuring the fluid tightness of the part or parts of the crank casing forming the pump body or bodies.

The crank casing of a two stroke cycle engine generally serves as a pump body and the joints which the crank shaft has to pass through are constituted by the bearings and brasses thereof. This arrangement has various disadvantages, for instance, the fluid tightness of the joint depends upon the wear of the bearings which have to support the weight of the crankshaft and the stresses to which it is subjected. Furthermore, there is risk in lubricating the bearing brasses more abundantly than is necessary, because when the oil penetrates in great quantities into the crank casing it mixes with the gas, fouls the cylinder and may seriously derange the working of the motor. Again, in the crank casing this oil mixes with dust and solid particles, carried in by the air drawn into the pump body, and is a frequent cause of jamming and abnormal wear. On the other hand, in multi-cylinder engines, it is necessary to interpose supporting bearings between the successive cranks of the crank shaft, a proceeding which considerably augments the weight of the motor and the space occupied thereby.

According to the present invention, these disadvantages are avoided by making the partitions which insure the fluid tightness of the pump body or bodies of the crank casing, independent of the bearings and the brasses of the crank shaft. These partitions are constituted preferably by the webs themselves of the crankshaft, which are provided for this purpose with circular surfaces which bear against corresponding surfaces integral with the crank casing and form tight joints therewith. In an engine with a simple crank, these joints inclose that part of the crank casing which serves as a pump body. The outermost joints fulfil the same purpose in a multi-cylinder engine while the intermediate joints divide the crank casing proper into as many independent pump bodies as there are cylinders. These pump bodies are adjacent to each other and give the engine a very compact appearance. Since the main bearings are isolated from the crank casing proper they may be lubricated with floods of oil without there being any fear of danger resulting from the introduction of large quantities of oil into the pump body or bodies.

The accompanying illustrative drawing shows in section, by way of example, the crank casing of a twocylinder engine provided with partitions according to this invention.

The journals 1 of the crank shaft rotate as usual, in bearings 2 carried by the outer walls 3 of the crank casing. The webs 4 of the crank shaft are constituted by disks the peripheries of which are located opposite rings 5 fixed to the walls 3 of the crank casing or to ribs 6 integral therewith. The rotating disks 4 form, with the fixed rings 5, joints the fluid tightness of which is assured by rings or annular segments 7 fitted into grooves 8 formed therefor in the peripheries of the disks 4. A baffle joint or seal is thus provided which allows the revolving parts to move slightly in a longitudinal direction under the action of expansion, and in a transverse direction under the action of wear, owing to the play existing between the peripheries of the disks 4 and the rings 5 and between the bottom of the grooves 8 and the outer peripheries of the rings or segments 7.

The three disks 4 divide up the crank casing into four entirely separate compartments, that is to say two fluid tight inner compartments 9 each communicating with one of the cylinders 10 and two outer compartments 11 which contain the crank shaft bearings 2 and through which the lubrication is effected.

It will be seen that the compartments 9, which form the pump bodies, are directly located alongside each other. The dotted lines denoted by 12 represent sheet iron filling pieces which may be fixed to the disks 4 so as to diminish the dead spaces of the pump bodies.

The main bearings 2 are lubricated in the usual way through suitable pipes 13. A portion of the oil which runs away from the bearings 2, may with advantage be distributed by centrifugal force to the bearings 14 of the driving cranks 15 for the purpose of lubricating them. For this purpose buckets 16, which communicate with the inner face of the crank pin bearings 14 by a passage 17 formed in the metal, are fixed on the outsides of the outermost disks 4. The buckets 16 are of such dimensions as to admit the desired quantity of oil to the bearings 14 and consequently to the pump body.

The excess of oil from the bearings 2 falls back to the bottom of the outer compartments 11 of the crank casing and passes thence into a reservoir 18, through holes 19. When the motor is working, a thin layer of oil derived from the lubrication of the bearings 2, is deposited by centrifugal force between the peripheries of the disks 4, the rings 5, the rings or segments 7 and the walls and bottoms of the grooves 8, and forms a hydraulic baffle joint or seal which prevents all communication between the pump body 9 and the outer compartments of the crank casing.

The differences of pressure on the sides of the disks 4 being never considerable and succeeding each other very rapidly with alternately positive and negative values, the joints described prevent the introduction of oil into the pump body and also all leakage of the gases compressed therein. The bearings 2 may therefore without inconvenience be as copiously lubricated as the proper working of the engine demands.

The details of construction may obviously be modified without departing from the invention and in particular the fluid tight joints may be made at the sides of the disks instead of on their peripheries.

What I claim to be new and desire to secure by Letters Patent, is:—

1. In a two cycle internal combustion engine, the combination with the cylinder thereof; of a crank case having outer walls and spaced inwardly projecting annular ribs, bearing rings attached to said ribs, a crank shaft having portions mounted in said bearing of the outer walls, disk-shaped webs for said shaft, packing means between all of said disks and the corresponding webs to form fluid tight joints therebetween, a lubricating device for each of said bearings of the crank shaft, means for leading part of the oil derived from the lubrication of said bearings to the crank pin bearings of the crank shaft by centrifugal action, the joints between the disks and webs being supplied with lubricant by centrifugal force and means for collecting the remaining part of the oil supplied to the bearings.

2. In a two stroke cycle internal combustion engine, the combination of cylinders, pistons, a crank casing common to all the cylinders, a crank shaft having disk-shaped webs provided with grooves on their periphery, annular segments fitted in said grooves and bearing on surfaces integral with the crank casing walls so as to form fluid tight baffle joints therewith, bearings for said crank shaft on either side of the outermost crank shaft webs a lubricating device for said bearings, buckets on said outermost webs for collecting part of the oil derived from the lubrication of said bearings, passages bored in said crank shaft for leading the oil from said buckets to the crank pin bearings, and means for collecting the remaining part of the oil and maintaining a thin layer of oil between the rotary and the fixed parts of said fluid tight joints.

In testimony whereof I have affixed my signature in presence of two witnesses.

THEÓPHILE BERLIZE.

Witnesses:
 HENRY W. PLUCKER,
 CHAS. ROY NASMITH.